(12) United States Patent
Matsubara

(10) Patent No.: US 9,965,828 B2
(45) Date of Patent: May 8, 2018

(54) IMAGE PROCESSING APPARATUS FOR KEEPING AN IMAGE FROM TRANSFORMING INTO AN INDETERMINATE SHAPE IN IMAGE TRANSFORMATION PROCESSING

(71) Applicant: CASIO COMPUTER CO., LTD., Tokyo (JP)

(72) Inventor: Masao Matsubara, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/060,811

(22) Filed: Mar. 4, 2016

(65) Prior Publication Data

US 2016/0343110 A1 Nov. 24, 2016

(30) Foreign Application Priority Data

May 21, 2015 (JP) ................................ 2015-103977

(51) Int. Cl.
*G06K 9/00* (2006.01)
*G06T 3/00* (2006.01)

(52) U.S. Cl.
CPC ................. *G06T 3/0012* (2013.01)

(58) Field of Classification Search
CPC ........................................... G06T 3/00–3/608
USPC ....... 382/201, 276, 126, 154, 155, 251, 285, 382/289; 250/559.29, 237 G; 345/419, 345/420, 582, 601, 627, 660; 361/303, 361/324; 379/406.08; 370/465; 381/71.11; 358/426.06; 463/30; 702/1, 702/25

See application file for complete search history.

(56) References Cited

U.S. PATENT DOCUMENTS

| 5,559,937 A * | 9/1996 | Takeda ............... G06T 15/30 345/627 |
| 6,757,445 B1 * | 6/2004 | Knopp ............... G01C 11/06 382/154 |

(Continued)

FOREIGN PATENT DOCUMENTS

JP 2011-97217 A 5/2011 ............. H04N 5/232

*Primary Examiner* — Aaron W Carter
(74) *Attorney, Agent, or Firm* — Fitch Even Tabin & Flannery LLP

(57) ABSTRACT

A provisional coefficient acquirer of an image processing apparatus acquires provisional coefficients for projection conversion of an image, on the basis of feature points indicating features of the image. A polygon converter does projection conversion on a polygon having a plurality of fixed points as vertices, on the basis of the provisional coefficients acquired by the provisional coefficient acquirer. A transformation degree acquirer acquires a transformation degree indicating a magnitude of the transformation degree of the polygon from the pre-projection-conversion polygon and the post-projection-conversion polygon. A determiner determines whether the transformation degree acquired by the transformation degree acquirer exceeds a permitted transformation degree. When the determiner determines that the transformation degree does not exceed the permitted transformation degree, a projection converter does projection conversion on the image using as actual coefficients the provisional coefficients acquired by the provisional coefficient acquirer.

17 Claims, 5 Drawing Sheets

(56) References Cited

U.S. PATENT DOCUMENTS

| | | | | |
|---|---|---|---|---|
| 7,091,988 B2* | 8/2006 | Hori | ............... | G06T 7/251 345/474 |
| 7,483,056 B2* | 1/2009 | Shinohara | ............... | H04N 5/217 348/208.7 |
| 7,809,193 B2* | 10/2010 | Iwasaki | ............... | G01B 11/25 382/181 |
| 8,537,173 B2* | 9/2013 | Uesaki | ............... | G06T 15/04 345/582 |
| 8,548,230 B2* | 10/2013 | Kameyama | ............... | G06K 9/00221 382/155 |
| 9,607,423 B2* | 3/2017 | Nakagawa | ............... | G06T 15/00 |
| 2002/0018589 A1* | 2/2002 | Beuker | ............... | A61B 6/5241 382/132 |
| 2008/0175491 A1* | 7/2008 | Kondo | ............... | G06F 17/30247 382/232 |
| 2012/0062588 A1* | 3/2012 | Sato | ............... | G06T 3/0006 345/611 |
| 2016/0182873 A1* | 6/2016 | Sumiyoshi | ............... | H04N 9/3185 348/747 |
| 2016/0217318 A1* | 7/2016 | Hayasaka | ............... | G06T 3/60 |
| 2016/0343110 A1* | 11/2016 | Matsubara | ............... | G06T 3/0012 |
| 2016/0350896 A1* | 12/2016 | Matsubara | ............... | G06T 5/003 |
| 2016/0371817 A1* | 12/2016 | Matsubara | ............... | G06T 5/002 |

* cited by examiner

FIG. 5

TRANSFORMATION DEGREE TABLE

| TRANSFORMATION RATIO (%) | TRANSFORMATION DEGREE |
|---|---|
| 100 | 0 |
| 99 | 1 |
| 98 | 2 |
| 97 | 3 |
| 96 | 4 |
| 95 | 5 |
| 94 | 6 |
| ⋮ | ⋮ |
| 0 | 100 |

IMAGE PROCESSING APPARATUS FOR KEEPING AN IMAGE FROM TRANSFORMING INTO AN INDETERMINATE SHAPE IN IMAGE TRANSFORMATION PROCESSING

CROSS-REFERENCE TO RELATED APPLICATION

This application claims the benefit of Japanese Patent Application No. 2015-103977, filed on May 21, 2015, the entire disclosure of which is incorporated by reference herein.

FIELD

This application relates generally to an image processing apparatus for keeping an image from transforming into an indeterminate shape in image transformation processing.

BACKGROUND

Recently, correction of blurring in video comprising a plurality of images (frames) has been accomplished through digital technology.

As a method of blur correction in videos, art for extracting feature points in four corners of an image and accomplishing projection conversion of the image using the amount of movement of the feature points of the four corners is disclosed for example in Unexamined Japanese Patent Application Kokai Publication No. 2011-97217.

SUMMARY

An image processing apparatus according to one aspect of the present application is provided with a processing unit, the processing unit executing:

a provisional coefficient acquisition process that acquires provisional coefficients for doing projection conversion on an image, on the basis of feature points indicating features of the image;

a conversion process that does projection conversion on a polygon having a plurality of fixed points as vertices, using the provisional coefficients acquired by the provisional coefficient acquisition process;

a transformation degree acquisition process that acquires a transformation degree indicating a magnitude of the transformation degree of the polygon from the polygon prior to projection conversion by the conversion process and the polygon after projection conversion by the conversion process;

a determination process that determines whether or not the transformation degree acquired by the transformation degree acquisition process exceeds a permitted transformation degree; and a projection conversion process that, when the transformation degree is determined to not exceed the permitted transformation degree by the determination process, does projection conversion on the image using as actual coefficients the provisional coefficients acquired by the provisional coefficient acquisition process.

An image processing apparatus according to another aspect of the present application is provided with a processing unit, the processing unit executing:

a projection conversion coefficient acquisition process that acquires projection conversion coefficients for doing projection conversion on an image, on the basis of feature points indicating features of the image;

a projection conversion process that does projection conversion on the image, using the projection conversion coefficients acquired by the projection conversion coefficient acquisition process;

a transformation degree acquisition process that acquires a transformation degree indicating the magnitude of the transformation degree of the image, from the image prior to projection conversion by the projection conversion process and the image after projection conversion by the projection conversion process; and a determination process that determines whether or not the transformation degree acquired by the transformation degree acquisition process exceeds a permitted transformation degree;

wherein when the transformation degree is determined to not exceed the permitted transformation degree by the determination process, the image after projection conversion by the projection conversion process is a formal converted image.

BRIEF DESCRIPTION OF THE DRAWINGS

A more complete understanding of this application can be obtained when the following detailed description is considered in conjunction with the following drawings, in which:

FIG. 5 is a drawing showing one example of a transformation degree table; and

DETAILED DESCRIPTION

An exemplary embodiment of the present disclosure is described below with reference to the drawings.

Figure 1:
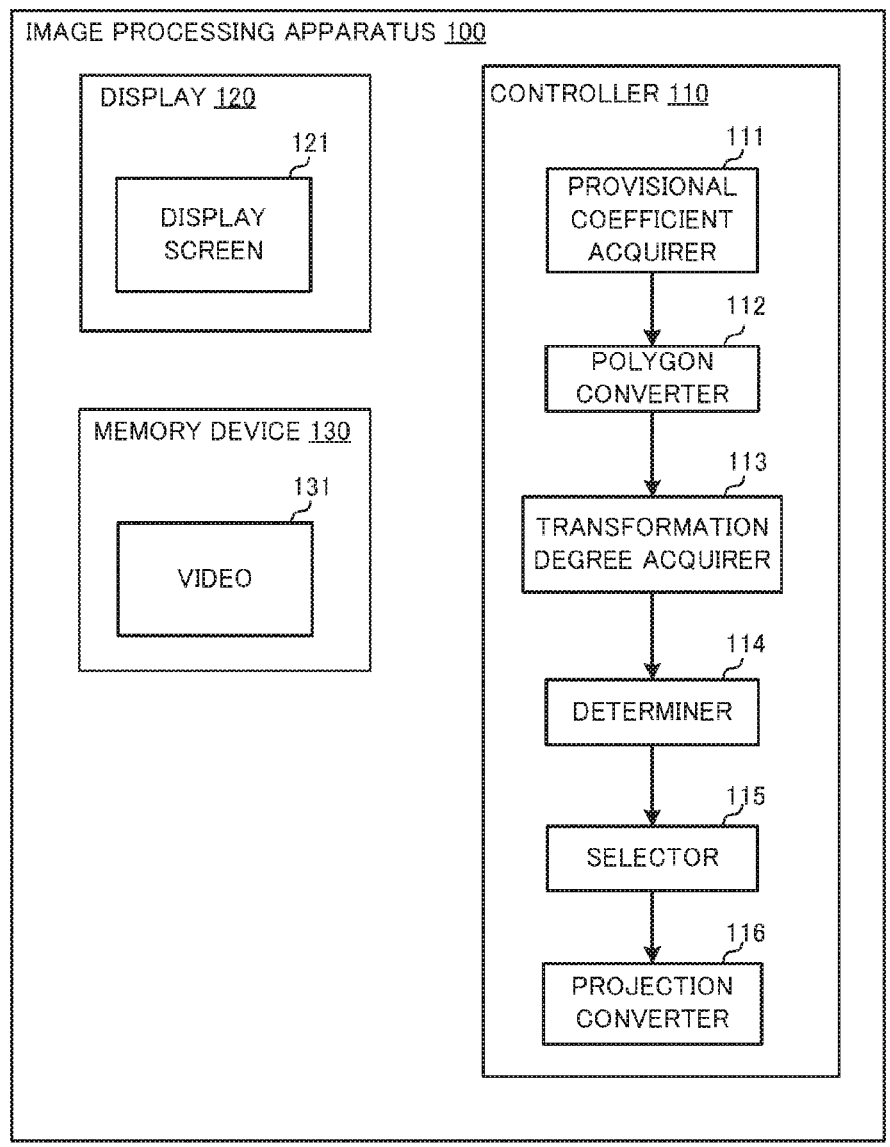
FIG. 1 is a block diagram showing a configuration of an image processing apparatus.

As shown in FIG. 1, an image processing apparatus 100 is, for example, a personal computer (PC) and comprises a controller 110, a display 120 and a memory device 130. The image processing apparatus 100 accomplishes image processing for each of the images (each of the frames) that make up the video 131. In particular, the image processing apparatus 100 according to this exemplary embodiment accomplishes, as image processing, projection conversion that transforms an image. Projection conversion coefficients for accomplishing the projection conversion are obtained using a plurality of pairs, each pair comprising a feature point indicating a feature of the image, and a smoothing point on a smoothing trajectory that smooths the feature point trajectory in a video containing the image.

Below, a pre-process for finding the feature points and smoothing points accomplished in advance of the projection conversion is described with reference to the overview diagram of FIG. 2. This pre-process is commonly known art, and thus is described below as a general consideration separate from the configuration for projection conversion according to the present exemplary embodiment shown in FIG. 1. In addition, for ease in understanding, in FIG. 2 a case in which there is one feature point indicated as a black dot is described as an example, but an image (frame) comprising an actual video contains a plurality of feature points.

Figure 2:
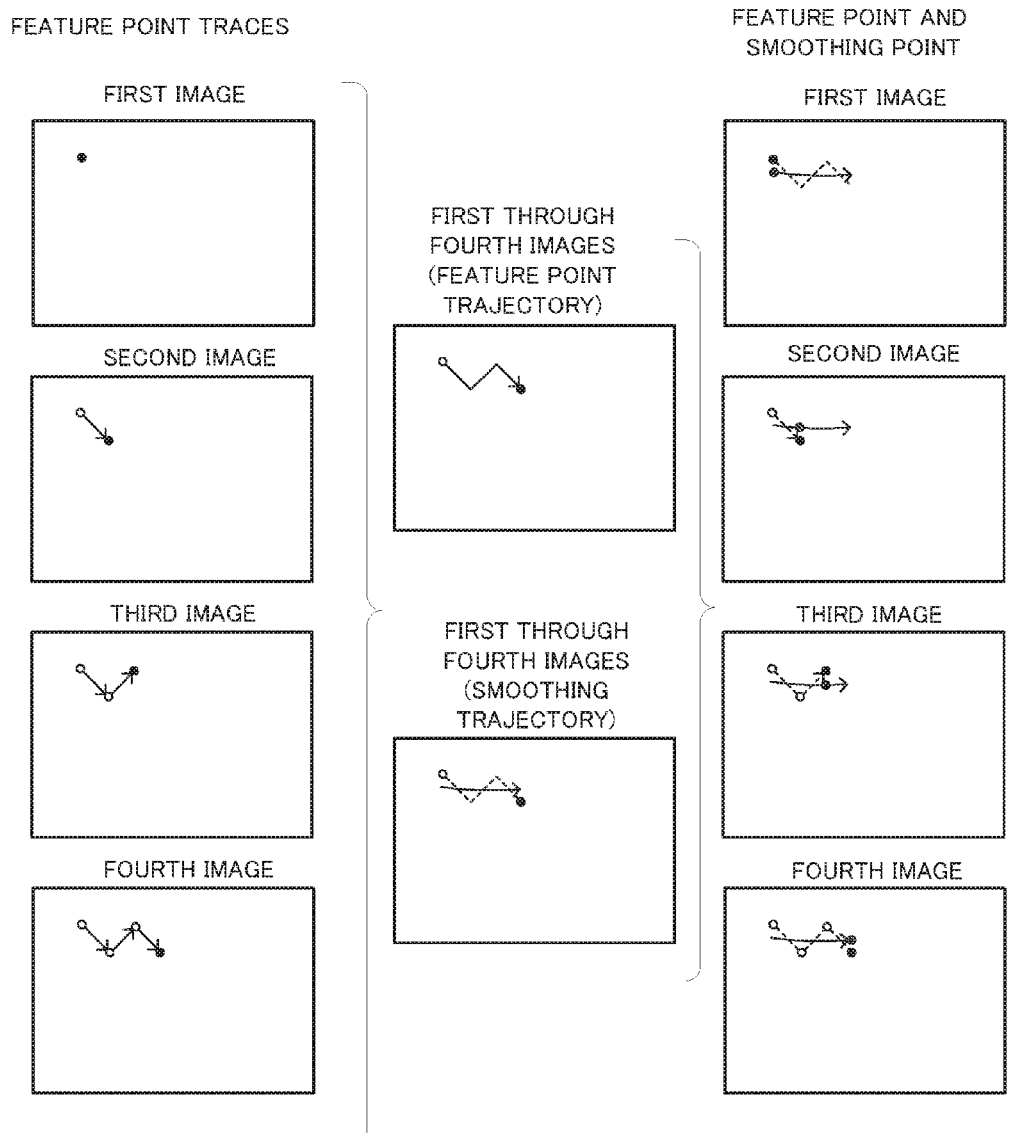
FIG. 2 is an overview diagram showing one example of feature point trajectories and smoothing point trajectories.

First, in the first image, which is a frame comprising a video, a feature point is extracted, as shown by the feature point trace in FIG. 2. The feature point is a point feature in the image, such as an angle of an object or an intersection of line segments. The feature point is extracted from the image for example using an algorithm such as the Harris/Plessey method, the KLT method, the Hessian method and/or the like.

Next, the feature point thus extracted is traced chronologically across the second through fourth images. The feature point trace is accomplished for example using an algorithm that uses concentration gradient, block matching and/or the like.

Through the feature point trace, a zig-zag feature point trajectory is obtained in the first through fourth images shown in FIG. 2. By smoothing the feature point trajectory, the smoothed trajectory of the first through fourth images indicated by a solid line is obtained. This smoothing is accomplished using a low-pass filter, for example.

Through this, smoothing points (o's and x's) on the smoothed trajectory corresponding to the feature points are obtained in each image, as indicated by the feature points and the smoothing points in FIG. 2. The feature point and the smoothing point form a pair, and by accomplishing an image transformation process (in this exemplary embodiment, projection conversion in particular) that causes the feature point to move to the smoothing point on each image, blur correction of the video is accomplished. In actuality, a plurality of feature points in the image is caused to move to the respectively corresponding smoothing points.

The above is the pre-process accomplished in advance of projection conversion.

Below, a configuration according to projection conversion is described with reference to FIG. 1, with the pre-process as a prerequisite.

First, the memory device 130 is a non-volatile memory such as a hard disk drive (HDD) and/or the like. This memory device 130 stores a video 131. The video is for example a video shot at a prescribed frame rate by a photography apparatus (camera), on which the pre-process has been undertaken. Consequently, each image comprising the video 131 contains a plurality of feature points and a plurality of smoothing points respectively corresponding to the plurality of feature points.

Next, the display 120 comprises a display such as a liquid crystal or organic electroluminescence (EL) display, and/or the like, and a light source such as backlight and/or the like for uniformly illuminating the display. The display 120 comprises a display screen (screen) 121 that displays videos and images.

Next, the controller 110 comprises a processing unit, read only memory (ROM), random access memory (RAM) and/or the like. The processing unit of the controller 110 realizes various functions (a provisional coefficient acquirer 111, a polygon converter 112, a transformation degree acquirer 113, a determiner 114, a selector 115 and a projection converter 116) by reading and executing programs for projection conversion stored in the ROM.

The provisional coefficient acquirer 111 acquires provisional coefficients for doing projection conversion on an image, on the basis of feature points showing features of the image. Specifically, the provisional coefficient acquirer 111 acquires provisional coefficients for projection conversion on the basis of four pairs arbitrarily selected from among the plurality of pairs comprising smoothing points and feature points included in the image.

The provisional coefficients are acquired through equation (1) below.

[Formula 1]

$$\begin{pmatrix} X_1 \\ X_2 \\ X_3 \\ X_4 \\ Y_1 \\ Y_2 \\ Y_3 \\ Y_4 \end{pmatrix} = \begin{pmatrix} x_1 & y_1 & 1 & 0 & 0 & 0 & -X_1x_1 & -X_1y_1 \\ x_2 & y_2 & 1 & 0 & 0 & 0 & -X_2x_2 & -X_2y_2 \\ x_3 & y_3 & 1 & 0 & 0 & 0 & -X_3x_3 & -X_3y_3 \\ x_4 & y_4 & 1 & 0 & 0 & 0 & -X_4x_4 & -X_4y_4 \\ 0 & 0 & 0 & x_1 & y_1 & 1 & -Y_1x_1 & -Y_1y_1 \\ 0 & 0 & 0 & x_2 & y_2 & 1 & -Y_2x_2 & -Y_2y_2 \\ 0 & 0 & 0 & x_3 & y_3 & 1 & -Y_3x_3 & -Y_3y_3 \\ 0 & 0 & 0 & x_4 & y_4 & 1 & -Y_4x_4 & -Y_4y_4 \end{pmatrix} \begin{pmatrix} a \\ b \\ c \\ d \\ e \\ f \\ g \\ h \end{pmatrix} \quad \text{(Eq. 1)}$$

Here, (x1~x4, y1~y4) are the coordinates of four feature points. In addition, (X1~X4, Y1~Y4) are the coordinates of the smoothing points that are respectively paired with the four feature points. In addition, (a, b, c, d, e, f, g, h) are the provisional coefficients for projection conversion. As is clear from this equation (1), in finding the projection conversion coefficients for projection conversion, four pairs of feature points and smoothing points are necessary.

Next, the polygon converter 112 does projection conversion on a polygon (triangle n-gon) with a plurality of fixed points as vertices, using the provisional coefficients acquired by the provisional coefficient acquirer 111. In this exemplary embodiment, the description will suppose, as one example, that the polygon is a rectangle having as vertices four fixed points in the four corners of the image.

Figure 3:
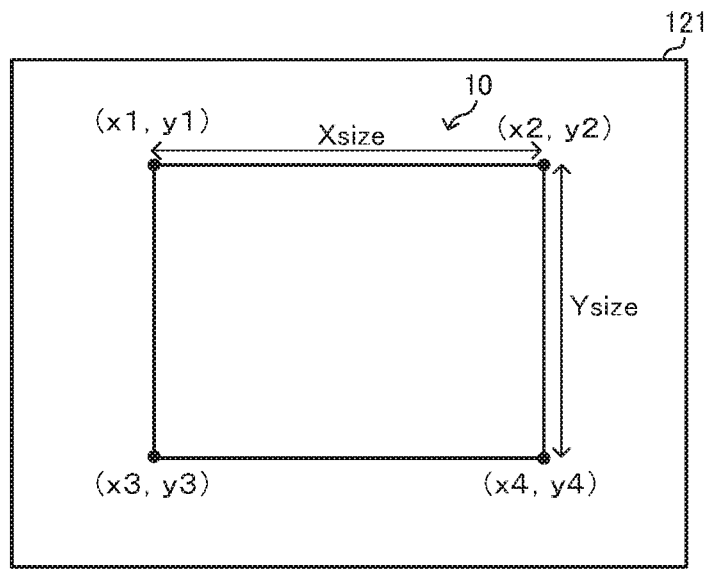
FIG. 3 is a drawing showing one example of an image before projection conversion.

Here, an image 10 is shown in FIG. 3. For ease in understanding, the description supposes that the image 10 is projected onto the display screen 121, but naturally the image processing apparatus 100 may process the image internally without the user seeing. The image 10 is one frame comprising the video 131, and is an image for which the provisional coefficients were acquired. The coordinates of the four corners of the image 10 are (x1, y1)~(x4, y4). Xsize and Ysize are for example determined by actual size on the basis of the number of pixels. Also, for the sake of differentiation, any images described hereinafter are simply referred to as "image" when it is not necessary to give special designation to the image 10 shown in FIG. 3.

The polygon converter 112 does projection conversion on the coordinates (x1, y1)~(x4, y4) of the four corners through equation (2) below, using the acquired provisional coefficients.

[Formula 2]

$$\left( x' = \frac{ax_i + by_i + c}{gx_i + hy_i + 1}, \; y' = \frac{dx_i + ey_i + f}{gx_i + hy_i + 1} \right) \quad \text{(Eq. 2)}$$

Figure 4:
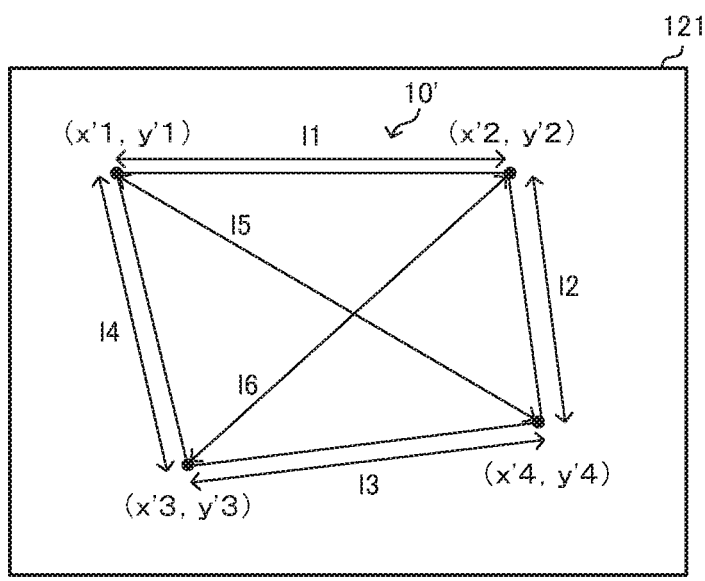
FIG. 4 is a drawing showing one example of an image after projection conversion.

Here, $(x_i, y_i)$ are arbitrary coordinates in the image, and i is a natural number that is 1 or greater. In addition, (x', y') are post-projection-conversion coordinates. The polygon converter 112 substitutes the provisional coefficients (a, b, c, d, e, f, g, h) and the coordinates (x1, y1)~(x4, y4) of the four corners into the equation (2), finds the post-projection-conversion coordinates (x'1, y'1)~(x'4, y'4) and transforms the image 10. FIG. 4 shows a post-projection-conversion image 10'. It can be seen that the post-projection-conversion image 10' shown in FIG. 4 is transformed compared to the pre-projection-conversion image 10 in FIG. 3.

Next, the transformation degree acquirer 113 acquires the transformation degree indicating the magnitude of the degree of transformation of the polygon from the polygon prior to projection conversion by the polygon converter 112 and the polygon after projection conversion by the polygon converter 112. In this exemplary embodiment, the transformation degree acquirer 113 acquires the transformation degree from the pre-projection-conversion quadrilateral image 10 of FIG. 3 and the post-projection-conversion quadrilateral image 10' of FIG. 4.

The transformation degree is found from the ratios of the length of each side (l1~l4) and the diagonals (l5 and l6) of the image 10', and the lengths of the sides and diagonals of the image 10 corresponding to those sides and diagonals. The transformation degree acquirer 113 first finds the length of each side (l1~l4) and the diagonals (l5 and l6) of the image 10' through equation (3) below.

[Formula 3]

$$l1 = \sqrt{(x'2-x'1)^2+(y'2-y'1)^2}$$

$$l2 = \sqrt{(x'4-x'2)^2+(y'4-y'2)^2}$$

$$l3 = \sqrt{(x'3-x'4)^2+(y'3-y'4)^2}$$

$$l4 = \sqrt{(x'1-x'3)^2+(y'1-y'3)^2}$$

$$l5 = \sqrt{(x'4-x'1)^2+(y'4-y'1)^2}$$

$$l6 = \sqrt{(x'3-x'2)^2+(y'3-y'2)^2} \quad \text{(Eq. 3)}$$

Next, the transformation degree acquirer 113 finds the ratios of the lengths of the image 10 prior to projection conversion through equation (4) below, based on the lengths found in the post-projection-conversion image 10'.

[Formula 4]

$$\text{ratio1} = l1/X\text{size}$$

$$\text{ratio2} = l2/Y\text{size}$$

$$\text{ratio3} = l3/X\text{size}$$

$$\text{ratio4} = l4/Y\text{size}$$

$$\text{ratio5} = l5/\sqrt{(X\text{size}^2+Y\text{size}^2)}$$

$$\text{ratio6} = l6/\sqrt{(X\text{size}^2+Y\text{size}^2)} \quad \text{(Eq. 4)}$$

The transformation degree acquirer 113 selects a maximum value (Max_ratio) and a minimum value (Min_ratio) from among ratio 1~ratio 6, and sets the ratio of these as the transformation ratio of the image. That is to say, the transformation ratio of the image (quadrilateral) is Min_ratio/Max_ratio.

This transformation ratio indicates the extent to which the quadrilateral transforms before and after projection conversion, and as shown in FIG. 5, when the transformation ratio is 100%, there is no transformation, that is to say, the transformation degree is 0. The transformation degree increases as this transformation ratio decreases, so the transformation degree increases, as shown in the drawing. The transformation ratio is 100% when the figures are on top of one another before and after transformation as a result of scale conversion (expansion/contraction), parallel shifting, rotational shifting and/or the like, that is to say the transformation degree is 0 in the case of similar figures. Consequently, the transformation degree is greater than 0 to the extent that the figures are not similar (the two are not on top of one another).

The determiner 114 determines whether the transformation degree acquired by the transformation degree acquirer 113 exceeds a permitted transformation degree. The permitted transformation degree is set in advance so that the appearance of the video does not become unnatural, and is a standard for controlling transformation of images into indeterminate shapes. In this exemplary embodiment, the description will assume a permitted transformation degree of 5, as one example. The determiner 114 determines whether or not the acquired transformation degree exceeds 5.

When the transformation degree acquired by the determiner 114 exceeds the permitted transformation degree of 5, that is to say when the acquired transformation degree is 6 or larger, the processes of each component (the provisional coefficient acquirer 111, the polygon converter 112 and the transformation degree acquirer 113) are repeated. That is to say, the processes of each component are repeatedly executed until coefficients such that the acquired transformation degree does not exceed the permitted transformation degree of 5 are acquired.

Next, the selector 115 selects a provisional coefficient to be used as a actual coefficient, out of the plurality of provisional coefficients used in respective projection conversions of the plurality of polygons not exceeding the permitted transformation degree, when it is determined that there are a plurality of transformation degrees not exceeding the permitted transformation degree by the determiner 114 repeatedly making a determination. The process of the selector 115 is a so-called optimization process of selecting one provisional coefficient as the actual coefficient from among the plurality of provisional coefficients. Details of this process are described below.

Next, the projection converter 116 does projection conversion on the image using actual coefficients selected by the selector 115. In this exemplary embodiment, the projection converter 115 does projection conversion of the image 10 using actual coefficients. Here, projection conversion means obtaining post-projection-conversion coefficients (x', y') by substituting the actual coefficients (a, b, c, d, e, f, g, h) and the coordinates ($x_i$, $y_i$) of pixels comprising the image 10 into equation (2). By repeating this process for each of the coordinates of all pixels in the image 10, an image comprising pixels determined by post-projection-conversion coordinate position, that is to say a post-projection-conversion image, is obtained.

A configuration of the image processing apparatus 100 was described above. Below, a projection conversion process executed by the functions of the various components of the image processing apparatus 100 is described with reference to FIG. 6. This projection conversion process is started upon the user giving a projection conversion process execution command for the video 131 that has already undergone pre-processing. This is intended to be illustrative and not limiting, for naturally it would be fine for the pre-process and the projection conversion process to be executed in sequence on the video 131 on the basis of a user command. In addition, in the description below, the description takes the image 10 as a suitable example, out of the plurality of images comprising the video 131.

First, the provisional coefficient acquirer 111 determines whether or not there are at least four pairs comprising feature points and smoothing points (step S11). In this exemplary embodiment, the provisional coefficient acquirer 111 determines whether or not there are at least four pairs comprising feature points and smoothing points in the image 10. When there are not at least four pairs (step S11: No), the process promptly ends because provisional coefficients for projection conversion cannot be found.

On the other hand, when there are at least four pairs (step S11: Yes), the provisional coefficient acquirer 111 randomly selects four pairs (step S12). In this exemplary embodiment, the provisional coefficient acquirer 111 randomly selects four pairs of feature points and smoothing points from in the image 10.

Next, the provisional coefficient acquirer 111 acquires provisional coefficients on the basis of the selected four pairs (step S13). Specifically, the provisional coefficient acquirer 111 acquires the coefficients (a, b, c, d, e, f, g, h) from the coordinates of the feature points and the coordinates of the smoothing points of the selected four pairs using equation (1), as in the overview above.

Next, the polygon converter 112 does projection conversion on a polygon using the acquired provisional coefficients (step S14). In this exemplary embodiment, the polygon converter 112 does projection conversion on the image 10 shown in FIG. 3, which is a quadrilateral prior to projection conversion, using equation (2), and obtains the post-projection-conversion image 10' shown in FIG. 4, as in the overview above.

Next, the transformation degree acquirer 113 acquires the transformation degree of the polygon (step S15). Specifically, the transformation degree acquirer 113 acquires the transformation degree of the quadrilateral image 10 using equation (3) and equation (4), as in the overview above.

Next, the determiner 114 determines whether or not the transformation degree exceeds the permitted transformation degree (step S16). In this exemplary embodiment, the determiner 114 determines whether or not the transformation degree of the image 10 exceeds the permitted transformation degree of 5.

Here, when the transformation degree exceeds the permitted transformation degree (step S16: Yes), the process from step S12 through step S16 is repeated until the transformation degree does not exceed the permitted transformation degree (step S16: No).

That is to say, whenever it is determined by the determiner 114 that the transformation degree exceeds the permitted transformation degree, the provisional coefficient acquirer 111 repeatedly acquires provisional coefficients by changing at least one pair out of the randomly selected four pairs to a pair differing from the four pairs. Whenever provisional coefficients are acquired by the provisional coefficient acquirer 111, the polygon converter 112 uses the acquired provisional coefficients to repeatedly do projection conversion on the polygon (the image 10, which is a quadrilateral in this exemplary embodiment). The transformation degree acquirer 113 repeatedly acquires the transformation degree on the basis of the polygon that has undergone projection conversion, whenever the polygon undergoes projection conversion by the polygon converter 112. Whenever the transformation degree is acquired by the transformation degree acquirer 113, the determiner 114 repeatedly determines whether the transformation degree that was acquired exceeds the permitted transformation degree (the loop from steps S12 through S16). Through this, provisional coefficients such that the image 10 is transformed to the extent that uneasiness emerges in the appearance are excluded.

When the transformation degree does not exceed the permitted transformation degree (step S16: No), the selector 115 does projection conversion on all feature points, using the provisional coefficients (step S17). In this exemplary embodiment, the selector 115 does projection conversion on the coordinates of all feature points included in the image 10, using the provisional coefficients and equation (2).

Next, the selector 115 calculates the sum of distances between all feature points after projection conversion and the smoothing points respectively paired with the feature points (step S18). Specifically, the selector 115 finds, for each feature point, the distance (Euclidean distance) between the coordinates of a feature point after projection conversion and the coordinates of the smoothing point paired with that feature point, and sums the respective distances found.

While there are times when the feature points and the smoothing points overlay each other through projection conversion for the four pairs randomly selected for finding provisional coefficients (that is to say, the distance is 0), for other pairs the feature points and the smoothing points do not overlay each other (that is to say, the distance is larger than 0). Consequently, because the smaller the sum, the nearer all feature points are to all smoothing points, this is preferable for actual coefficients.

Next, the selector 115 determines whether or not the calculated sum is a minimum (step S19). Specifically, the selector 115 determines which out of the sum calculated using the current provisional coefficients and the sum calculated using the different provisional coefficients the previous time is a minimum.

When the selector 115 determines that the sum calculated using the current provisional coefficients is a minimum (step S19: Yes), the coefficients are temporarily stored as actual coefficients (step S20) and the process proceeds to step S21. On the other hand, if the sum calculated using the current provisional coefficients is not a minimum (step S19: No), the process skips step S20 and proceeds to step S21.

In step S21, the controller 110 determines whether or not a stipulated number of times has ended (step S21). When the stipulated number of times has not ended (step S21: No), the process from steps S12 through S20 is repeated until the stipulated number of times (for example, 500 times) ends (step S21: Yes).

Optimization of provisional coefficients is accomplished by repeating this process accomplishing the process from steps S17 through S20 only for provisional coefficients that do not transform the image 10 into an indeterminate shape in steps S12 through S16. In other words, from among the plurality of provisional coefficients that do not distort the image 10 into an indeterminate shape that were temporarily selected in steps S12 through S16, the selector 115 selects as actual coefficients provisional coefficients such that the sum of the distances between the post-projection-conversion coordinates obtained by doing projection conversion on the coordinates of all feature points in the image 10, and the coordinates of the smoothing points respectively paired with all of the feature points, is a minimum. That is to say, the selector 115 selects as actual coefficients provisional coefficients such that all feature points are closest to all smoothing points, out of the plurality of provisional coefficients found from the feature points that do not distort the image 10.

Returning now to FIG. 6, after the stipulated number of times has ended (step S21: Yes), the projection converter 116 does projection conversion on the image using the temporarily stored actual coefficients (step S22), and the process concludes. Specifically, the projection converter 116 does projection conversion on the image 10 with the optimized provisional coefficients as the actual coefficients, and concludes the process. Through this, it is possible to transform the image 10 without exceeding the permitted transformation degree, and also to ensure that all of the feature points in the image 10 are closest to all of the smoothing points.

The image 10 is one example, and the series of processes comprising the processes of each component (the provisional coefficient acquirer 111, the polygon converter 112, the transformation degree acquirer 113, the determiner 114, the selector 115 and the projection converter 116) is repeated for each image that is a frame comprising the video 131. When doing so, it would be fine for the value of the permitted transformation degree to be common for all images.

With the image processing apparatus 100 according to this exemplary embodiment, it is possible to avoid a situation in which provisional coefficients for doing projection conversion such that the permitted transformation degree of the image is exceeded become actual coefficients, by providing each of the components for projection conversion (the provisional coefficient acquirer 111, the polygon converter 112, the transformation degree acquirer 113, the determiner 114, the selector 115 and the projection converter 116). Consequently, even when projection conversion is done, the images in the video are not suddenly distorted when transformed due to factors such as background reflections of moving bodies, feature point tracing errors, the effects of parallax and/or the like. Accordingly, it is possible to suppress transformation of the image into an indeterminate shape.

In addition, with this image processing apparatus 100, by providing a selector 115 it is possible to select as actual coefficients provisional coefficients for which all feature points in the image are closest to all smoothing points, from among the plurality of provisional coefficients that do not exceed the permitted transformation degree. Consequently, it is possible to control blurring of the video and to control unnatural transformations such as sudden distortion of images in the video.

In addition, in this exemplary embodiment, the polygon converter 112 does projection conversion of the polygon having as vertices four fixed points in the four corners of the image 10, using the provisional coefficients. Consequently, it is possible to intuitively know to what extent the actual image 10 is distorted. Using a quadrilateral of an image with four concerns as a polygon is but one example, and it would be fine to find the transformation degree by a triangle or a polygon having five or more sides. In addition, the transformation degree need not be a transformation degree using the image, and it would be fine to find the transformation degree by doing projection conversion on a polygon mathematically in a two-dimensional plane differing from the image.

In addition, in the projection conversion process according to this exemplary embodiment, refining of provisional coefficients is accomplished on the basis of the transformation degree in a step prior to the process of steps S17 through S21 (the so-called Random Sample Consensus (RANSAC) method). Because the calculation of this process comprises a plurality of steps, the projection conversion process is possible even with a processing unit having low processing capabilities, and low-power-consumption driving of the projection conversion process is possible.

Figure 6:
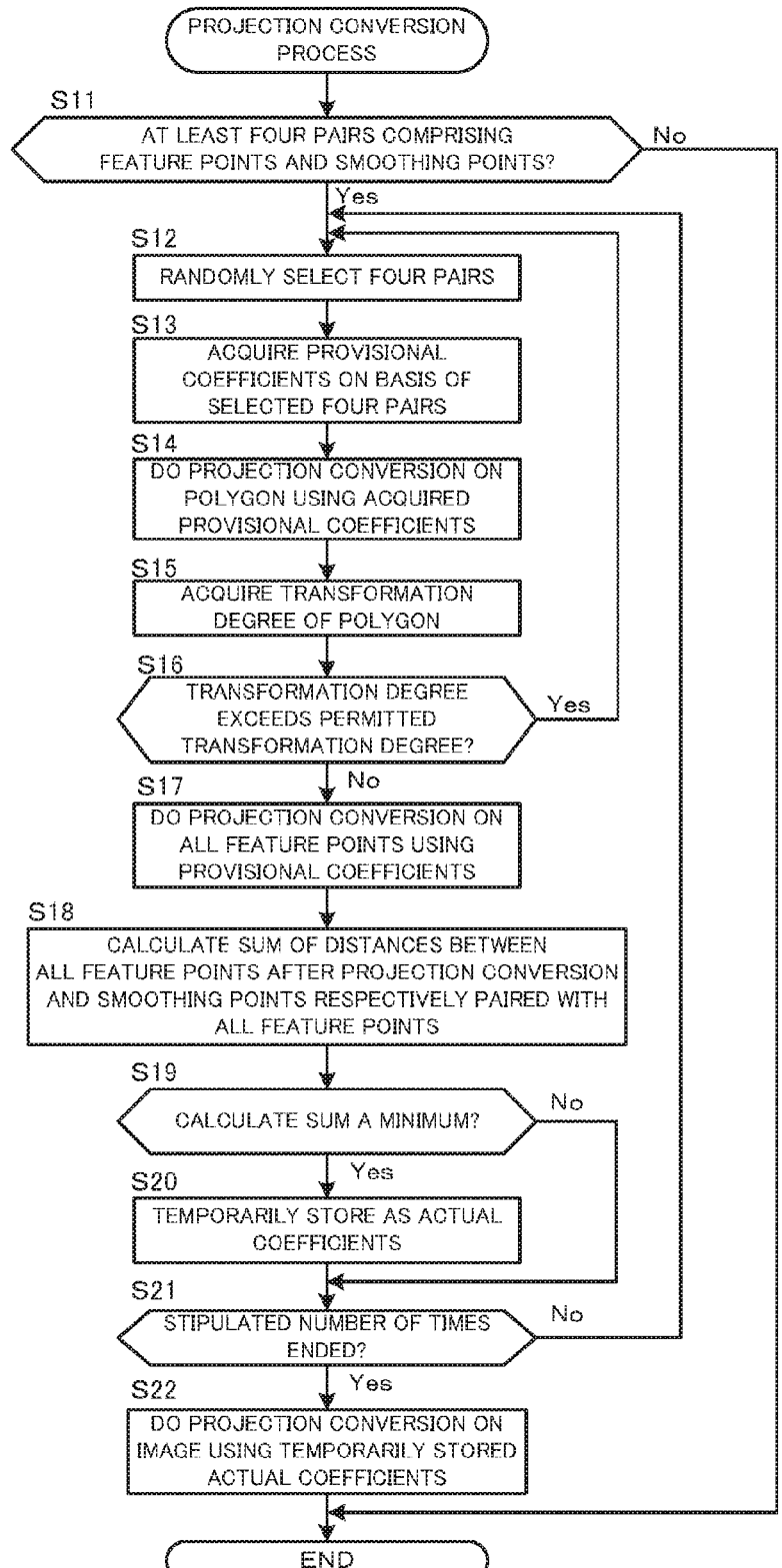
FIG. 6 is a flowchart showing one example of the flow of a projection conversion process.

This concludes the description of the exemplary embodiment, but naturally the specific configuration of the image processing apparatus 100 and the contents of the projection conversion process shown in FIG. 6 are not limited by the above description of the exemplary embodiment.

In the projection conversion process of the above-described FIG. 6, the optimization process of steps S17 through S21 was accomplished, but this is intended to be illustrative and not limiting. For example, without accomplishing the optimization process, when it is determined in step S16 that the transformation degree does not exceed the permitted transformation degree, it would be fine for the projection converter 116 to promptly do projection conversion of the image using the acquired provisional coefficients as the actual coefficients. Through this, it is possible to shorten processing time because it is possible to ease the processing burden of the optimization process, in addition to the above-described efficacy of the exemplary embodiment.

In addition, the image processing apparatus 100 according to the above-described exemplary embodiment was described under the assumption of being a PC, but this is intended to be illustrative and not limiting. For example, it would be fine for a capturing apparatus to comprise the functions of the various components of the image processing apparatus 100 and to accomplish the projection conversion process. In this case, if the projection conversion process is accomplished in real time while the user is recording the video, it is possible to control frame distortion and also mitigate blur correction in the video in live view.

In addition, in the above-described exemplary embodiment, projection conversion of the polygon was done using provisional coefficients, the transformation degree of the polygon before conversion and the polygon after conversion was acquired, a determination was made as to whether or not the transformation degree exceeded the permitted transformation degree, and projection conversion of the image was done using provisional coefficients for which it was determined that the permitted transformation degree was not exceeded, but this is intended to be illustrative and not limiting.

For example, the provisional coefficient acquirer 111 acquires the projection conversion coefficients for doing projection conversion on the image, on the basis of feature points indicating the features of the image. That is to say, the provisional coefficient acquirer 111 acquires projection conversion coefficients in place of provisional coefficients. Next, the projection converter 116 does projection conversion on the image using the acquired projection conversion coefficients. Next, the polygon converter 112 acquires the transformation degree from the original image prior to projection conversion and the image after projection conversion. Next, the determiner 114 determines whether or not the acquired transformation degree exceeds the permitted transformation degree. In addition, when it is determined by the determiner 114 that the transformation degree does not exceed the permitted transformation degree, it would be fine for the post-projection-conversion image to be made the formal converted image. Through this, it is possible to further shorten processing time compared to the above-described exemplary embodiment.

In addition, the various functions of the image processing apparatus 100 of this disclosure can be implemented through a computer such as a regular PC and/or the like. Specifically, in the above-described exemplary embodiment, the program for projection conversion was described as stored in advance in the ROM of the controller 110. However, it would be fine to configure a computer that can realize the functions of the above-described components by having a program for realizing the functions of the various components in FIG. 1 stored and distributed on a non-transitory computer-readable recording medium such as a flexible disk, a compact disc read only memory (CD-ROM), a digital versatile disc (DVD), a magneto-optical (MO) disc and/or the like, and for the program to be installed on the computer.

In addition, it would also be fine for the program to be stored on a disk device and/or the like possessed by a server device on a communication network such as the Internet and/or the like, and for example for a computer to be capable of downloading such.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image processing apparatus comprising:
   a controller being configured to:
   acquire provisional coefficients for doing projection conversion on an image, on the basis of feature points indicating features of the image;
   perform projection conversion on a polygon having a plurality of fixed points as vertices, using the acquired provisional coefficients;
   acquire a transformation degree indicating a magnitude of the transformation degree of the polygon from the polygon prior to projection conversion and the polygon after projection conversion;
   determine whether or not the transformation degree acquired by the transformation degree acquisition process exceeds a permitted transformation degree; and
   when the transformation degree is determined to not exceed the permitted transformation degree perform projection conversion on the image using as actual coefficients the acquired provisional coefficients.

2. The image processing apparatus according to claim 1, wherein:
   the controller is configured to convert a quadrilateral having four fixed points in four corners of the image as vertices, using the provisional coefficients; and
   acquire the transformation degree from the quadrilateral before projection conversion and the quadrilateral after projection conversion.

3. The image processing apparatus according to claim 1, wherein the controller is configured to perform projection conversion on a polygon having as vertices a plurality of fixed points on a two-dimensional plane differing from the image.

4. The image processing apparatus according to claim 1, wherein:
   the image contains at least four pairs, each pair comprising a feature point indicating a feature of the image, and a smoothing point on a smoothing trajectory that smooths a feature point trajectory of the feature point in a video containing the image as a frame; and
   the controller is configured to acquire the provisional coefficients on the basis of an arbitrarily selected four pairs, out of a plurality of pairs comprising feature points and smoothing points contained in the image.

5. The image processing apparatus according to claim 4, wherein:
   the controller is configured to repeatedly acquire provisional coefficients by changing at least one out of the four arbitrarily selected pairs to a pair differing from the four pairs, each time the transformation degree is determined to exceed the permitted transformation degree;
   repeatedly perform projection conversion on the polygon, using the acquired provisional coefficients, each time provisional coefficients are acquired;
   repeatedly acquire a transformation degree on the basis of the polygon that has undergone projection conversion, each time the polygon undergoes projection conversion by the conversion process; and
   repeatedly determine whether the acquired transformation degree exceeds the permitted transformation degree, each time the transformation degree is acquired.

6. The image processing apparatus according to claim 5, wherein when there is a plurality of transformation degrees that is determined to not exceed the permitted transformation degree by repeated determinations, the processing unit is configured to select provisional coefficients to be used as the actual coefficients, from the plurality of provisional coefficients used in projection conversion of the polygons having the plurality of transformation degrees.

7. The image processing apparatus according to claim 6, wherein:
   the controller is configured to select as the actual coefficients provisional coefficients such that the sum of the distances between post-projection-conversion coordinates of all of the feature points obtained through projection conversion of coordinates of all feature points of the image, and coordinates of smoothing points respectively paired with all of the feature points, is a minimum; and
   perform projection conversion on the image using the selected actual coefficients.

8. An image processing apparatus comprising:
   a controller being configured to:
   acquire projection conversion coefficients for doing projection conversion on an image, on the basis of feature points indicating features of the image;
   perform projection conversion on the image, using the acquired projection conversion coefficients;
   acquire a transformation degree indicating the magnitude of the transformation degree of the image, from the image prior to projection conversion and the image after projection conversion; and
   determine whether or not the transformation degree acquired by the transformation degree acquisition process exceeds a permitted transformation degree;
   wherein when the transformation degree is determined to not exceed the permitted transformation degree, the image after projection conversion is a formal converted image.

9. An image processing method using an image processing apparatus comprising a controller, being configured to:
   acquire provisional coefficients for doing projection conversion on an image, on the basis of feature points indicating features of the image;
   perform projection conversion on a polygon having a plurality of fixed points as vertices, using the acquired provisional coefficients;
   acquire a transformation degree indicating a magnitude of the transformation degree of the polygon from the polygon prior to projection conversion and the polygon after projection conversion;

determine whether or not the acquired transformation degree exceeds a permitted transformation degree; and when the transformation degree is determined to not exceed the permitted transformation degree, perform projection conversion on the image using as actual coefficients the acquired provisional coefficients.

10. The image processing method according to claim 9, wherein:

performing projection conversion comprises converting a quadrilateral having four fixed points in four corners of the image as vertices, using the provisional coefficients; and acquiring a transformation degree comprises acquiring the transformation degree from the quadrilateral before projection conversion and the quadrilateral after projection conversion.

11. The image processing method according to claim 9, wherein performing projection conversion comprises performing projection conversion on a polygon having as vertices a plurality of fixed points on a two-dimensional plane differing from the image.

12. The image processing method according to claim 9, wherein:

the image contains at least four pairs, each pair comprising a feature point indicating a feature of the image, and a smoothing point on a smoothing trajectory that smooths a feature point trajectory of the feature point in a video containing the image as a frame; and acquiring provisional coefficients comprises acquiring the provisional coefficients on the basis of an arbitrarily selected four pairs, out of a plurality of pairs comprising feature points and smoothing points contained in the image.

13. The image processing method according to claim 12, wherein:

acquiring provisional coefficients comprises repeatedly acquiring provisional coefficients by changing at least one out of the four arbitrarily selected pairs to a pair differing from the four pairs, each time the transformation degree is determined to exceed the permitted transformation degree in the determination step;

performing projection conversion comprises repeatedly performing projection conversion on the polygon, using the acquired provisional coefficients, each time provisional coefficients are acquired;

acquiring a transformation degree comprises repeatedly acquiring a transformation degree on the basis of the polygon that has undergone projection conversion, each time the polygon undergoes projection conversion; and determining whether or not the acquired transformation degree exceeds a predetermined transformation degree comprises repeatedly determining whether the acquired transformation degree exceeds the permitted transformation degree, each time the transformation degree is acquired.

14. The image processing method according to claim 13, wherein when there is a plurality of transformation degrees that is determined to not exceed the permitted transformation degree by repeated determinations in the determination step, the controller is further configured to select provisional coefficients to be used as the actual coefficients, from the plurality of provisional coefficients used in projection conversion of the polygons having the plurality of transformation degrees.

15. The image processing method according to claim 14, wherein:

selecting provisional coefficients comprises selecting as the actual coefficients provisional coefficients such that the sum of the distances between post-projection-conversion coordinates of all of the feature points obtained through projection conversion of coordinates of all feature points of the image, and coordinates of smoothing points respectively paired with all of the feature points, is a minimum; and performing projection conversion comprises performing projection conversion on the image using the selected actual coefficients.

16. The image processing method according to claim 9, wherein the controller is further configured to repeat a series of processes comprising the processes of the provisional coefficient acquisition, the projection conversion, the transformation degree acquisition, the determination of whether or not the acquired transformation degree exceeds a predetermined transformation degree, and the projection conversion, for each image that is a frame comprising a video.

17. A non-transitory computer-readable medium with a program recorded thereon, the program causing a computer of an image processing apparatus to:

acquire provisional coefficients for doing projection conversion on an image, on the basis of feature points indicating features of the image;

perform projection conversion on a polygon having a plurality of fixed points as vertices, using the acquired provisional coefficients;

acquire a transformation degree indicating a magnitude of the transformation degree of the polygon from the polygon prior to projection conversion and the polygon after projection conversion;

determine whether or not the acquired transformation degree exceeds a permitted transformation degree; and when the transformation degree is determined to not exceed the permitted transformation degree perform projection conversion on the image using as actual coefficients the acquired provisional coefficients.

* * * * *